United States Patent [19]

Ulinskas

[11] Patent Number: 5,158,406
[45] Date of Patent: Oct. 27, 1992

[54] BORING GUIDE FIXTURE

[76] Inventor: Thomas Ulinskas, 71 Tracy Ave., Waterbury, Conn. 06706

[21] Appl. No.: 679,560

[22] Filed: Apr. 2, 1991

[51] Int. Cl.⁵ .............................................. B23B 49/02
[52] U.S. Cl. ................................ 408/115 R; 408/72 R
[58] Field of Search ................. 408/16, 115 R, 115 B, 408/72 R, 72 B; 33/667, 562, 666, 638; 144/27

[56] References Cited

U.S. PATENT DOCUMENTS

| | | | |
|---|---|---|---|
| 626,488 | 6/1894 | Diehl | 408/115 R X |
| 2,497,733 | 2/1950 | Kebour | 408/115 R X |
| 2,497,733 | 2/1950 | Kebour | 408/115 X |
| 2,535,581 | 12/1950 | Klingman | 408/115 R X |
| 2,583,283 | 1/1952 | Volz | 408/115 R X |
| 2,740,308 | 4/1956 | Blanchard | 408/72 |
| 2,844,054 | 7/1958 | Bull et al. | 408/115 R |
| 2,930,263 | 3/1960 | Jones | 408/104 X |
| 3,026,748 | 3/1962 | Comorau | 408/115 R X |
| 3,273,426 | 9/1966 | Cleveland | 408/115 R X |
| 3,465,620 | 9/1969 | Hilburn | 408/115 R X |
| 3,674,376 | 7/1972 | Silken | 408/115 R |
| 4,306,823 | 12/1981 | Nashlund | 408/115 R X |
| 4,445,277 | 5/1984 | Keefe | 144/144.5 R X |

FOREIGN PATENT DOCUMENTS

| | | | |
|---|---|---|---|
| 1418830 | 10/1965 | France | 408/115 R |
| 2203069 | 10/1988 | United Kingdom | 408/115 R |

Primary Examiner—Larry I. Schwartz
Assistant Examiner—Robert Schultz
Attorney, Agent, or Firm—John R. Doherty

[57] ABSTRACT

The invention is directed to a fixture for accurately boring a hole in a workpiece which comprises a base member and a clamping means for mounting the fixture on top of the workpiece. A guide block is mounted in the base member for movement along a path extending across a surface of the workpiece. The guide block has an elongated boring guide hole extending therethrough in a direction towards the workpiece for guidingly receiving a boring bit. A scale or other similar means is affixed to the guide block for accurately locating the boring guide hole at a selectable, predetermiend position relative to the workpiece. One or more set screws or the like are provided on the base member for securing the guide block in place once the boring guide hole has been properly located. A series of detents or holes may also be provide on the guide block to receive the set screws and. thereby aid in locating the boring guide hole.

21 Claims, 5 Drawing Sheets

BORING GUIDE FIXTURE

BACKGROUND OF THE INVENTION

This invention relates generally to boring guide fixtures and, more particularly, it relates to a fixture for accurately boring a hole across the width of a wooden plank.

It is a common practice in the industry to join two or more pieces of wood together in edge to edge relationship by boring a hole in each piece and then inserting a dowel into each hole to join the two pieces together. This procedure has been widely used for making picture frames and constructing various kinds of furniture, for example. Depending upon how accurately the holes are drilled in each of the two pieces, a smooth joint of good appearance and quality can usually be achieved.

U.S. Pat. No. 4,449,867 issued to S.J. Dergo on May 22, 1984 discloses a drilling fixture for drilling dowel holes in a workpiece. The fixture includes a flat base plate having a slot therein and a drill guide block having a plurality of bores adapted to guidingly receive a drill bit for drilling a hole in the workpiece. The guide block is pivotally and slideably mounted within the slot so that the guide block can be positioned on top of the base plate at any angle relative to the workpiece. The drill guide bores are arranged in two rows, one on top of the other, so that holes can be drilled at different levels. Spacers are positioned beneath the guide block to raise the drill guide bores above the base plate in those cases where relatively large workpieces are employed. However, it is difficult, if not impossible, to accurately locate the guide bores at a given location on the surface of the workpiece when these spacers are used. Another difficulty with this fixture is that of accurately holding the drill bit in each guide bore so that the drill bit remains steady and does not become misaligned as it passes through the workpiece. This is particularly important in those cases where a long hole is to be bored through the workpiece such as when drilling a hole entirely across the width of a wooden plank.

SUMMARY OF THE INVENTION

The invention is directed to a fixture for accurately boring a hole in a workpiece. Broadly, the fixture comprises a base member and a clamping means for mounting the fixture on top of the workpiece. A guide block is mounted in the base member for movement along a path extending across the surface of the workpiece. The guide block has an elongated boring guide hole extending therethrough in a direction towards the workpiece for guidingly receiving a boring bit. A scale or other similar means is affixed to the guide block for accurately locating the boring guide hole at a selectable, predetermined position relative to the workpiece. A securing means is provided on the base member for securing the guide block in place once the boring guide hole has been properly located.

The boring guide fixture of the invention is preferably used to accurately bore a hole across the width of a wooden plank. In this preferred embodiment of the invention, the fixture includes a base member having an elongated extension on one side which serves as both a mounting and guide bar for mounting and aligning the fixture on top of the plank. The mounting and guide bar has a substantially flat surface which lies flush against the top planar surface of the plank and also has a straight lateral edge on one side to assist in aligning the fixture. The plank is secured against the mounting and guide bar by a clamping bracket affixed to the base member. The base member extends beyond the side edge of the plank and lies adjacent to the surface into which the hole is to be bored.

A guide block is mounted within the base member and is adapted to move along a path extending across the side edge of the plank. An elongated boring guide hole extends through the lower end of the guide block in a direction toward the plank and is of sufficient length and diameter to accurately hold an elongated boring bit for boring a hole across the width of the plank. Preferably, the guide block is slideably mounted in a dovetailed groove formed within the side wall of the base member. The guide block is also provided with dovetailed lateral edges tapered outwardly from one side in order to accurately fit inside the dovetailed groove.

An elongated scale is affixed to one side of the guide block and contains marks representing units of measure which indicate the distance between the longitudinal axis of the boring guide hole and a fixed point on the base member. This arrangement advantageously provides a means for easily locating the boring guide hole at a selectable, predetermined position relative to the surface of the plank which is to be drilled. A screw or other tightening means extends through the base member to make contact with the reverse side of the guide block and to hold or lock the block in place after the boring guide hole has been properly located.

An indexing means may also be provided on the guide block to aid in locating the boring guide hole relative to the workpiece. Such means preferably comprises a series of spaced apart notches arranged in a straight line on the surface of the guide block. The notches are adapted to receive the opposite end of the screw for securing the guide block inside the base member. Each notch is preferably arranged to correspond to an individual mark on the scale representing a unit of measure so that the guide block can be indexed to easily and accurately locate the boring guide hole at a selected, predetermined position relative to the surface of the plank.

BRIEF DESCRIPTION OF THE DRAWINGS

The invention will now be described in greater detail with particular reference to the accompanying drawings wherein.

DESCRIPTION OF THE PREFERRED EMBODIMENTS

Figure 1:
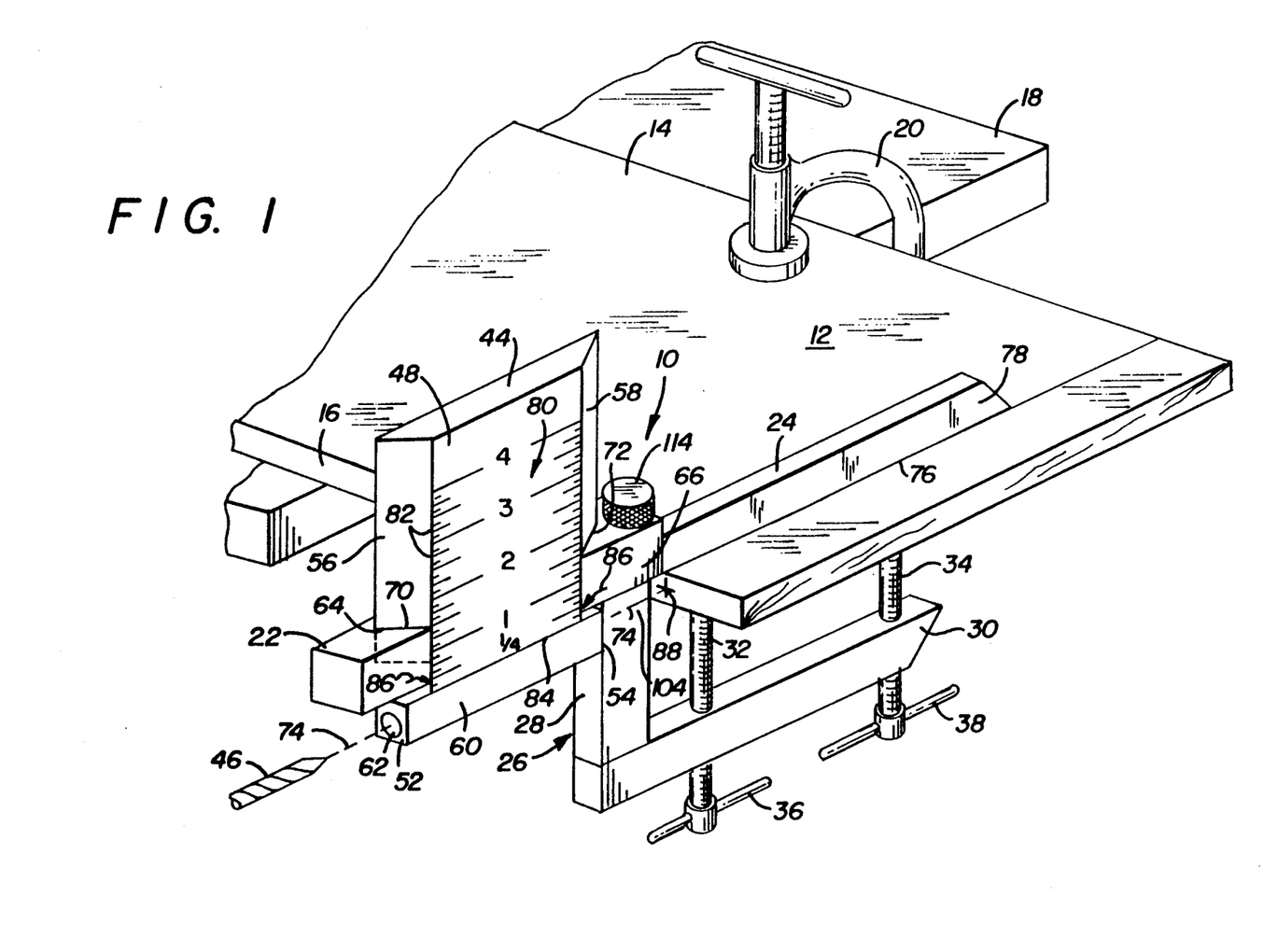
FIG. 1 is a perspective view of a boring guide fixture according to the invention shown affixed to a wooden plank for boring a hole across its width.

Referring now to the drawings and particularly to FIG. 1, a boring guide fixture 10 according to the invention is shown mounted on top of a workpiece which, in this case, is a wooden plank 12 having a wide top planar surface 14 and a relatively thin or narrow side edge 16, the fixture being arranged so as to bore a hole perpendicular to the side edge 16 of the plank. This arrangement is particularly useful for accurately boring matching holes across the width of two or more planks for joining them together in edge to edge relationship using long bolts, such as in the assembly of table tops and the like. However, this arrangement can also be employed to accurately drill matching dowel holes in picture frames, furniture and other similar articles. As shown, the plank 12 is preferably secured to the top of a work bench 18, for example, using a conventional C-clamp 20 or similar device.

The boring guide fixture 10 comprises an elongated, rectangular base member, generally indicated at 22, and includes a portion which extends outwardly therefrom to form a combined mounting and guide bar 24. The mounting and guide bar 24 is placed across the top surface 14 of the plank 12 during use with the base member 22 extending beyond the side edge 16 of the plank.

Figure 2:
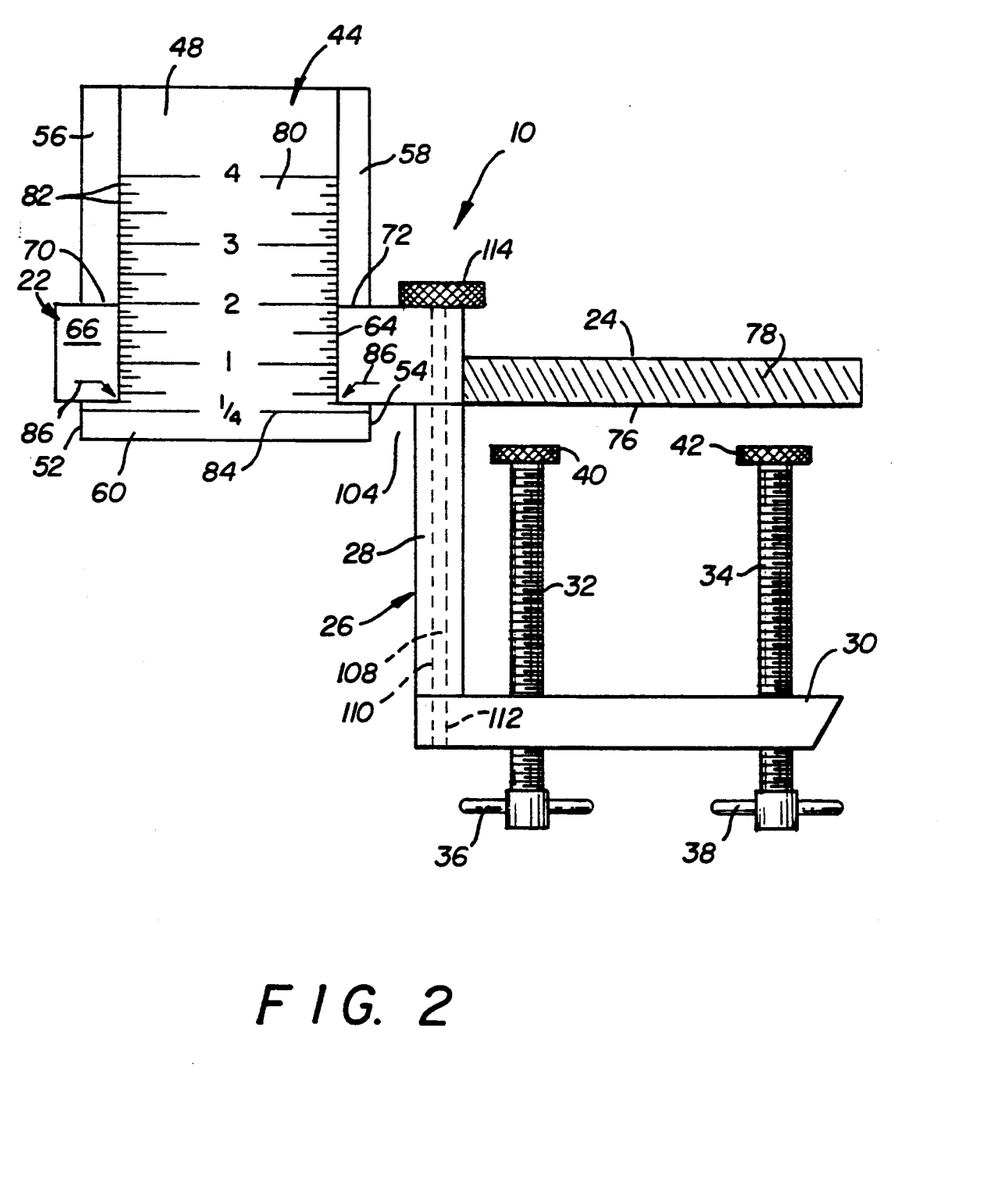
FIG. 2 is a front elevational view of the boring guide fixture shown in FIG. 1.
Figure 3:
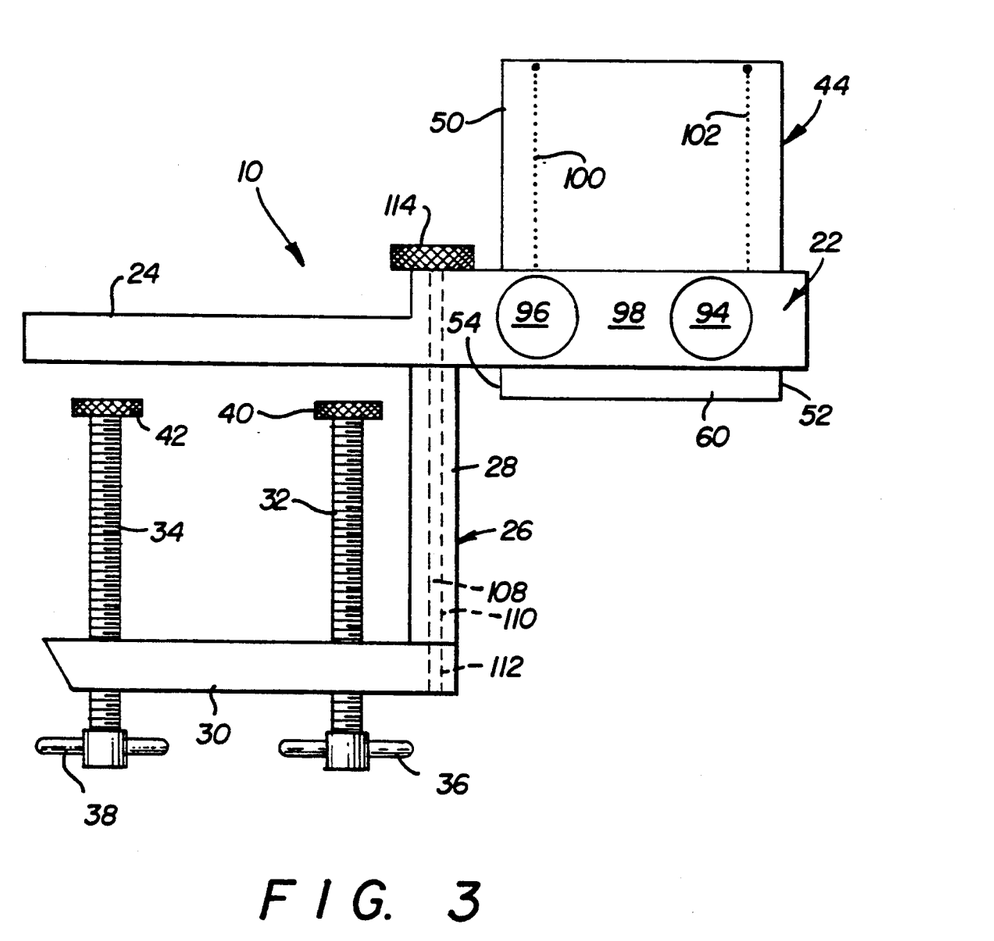
FIG. 3 is a rear elevational view of the fixture.
Figure 6:
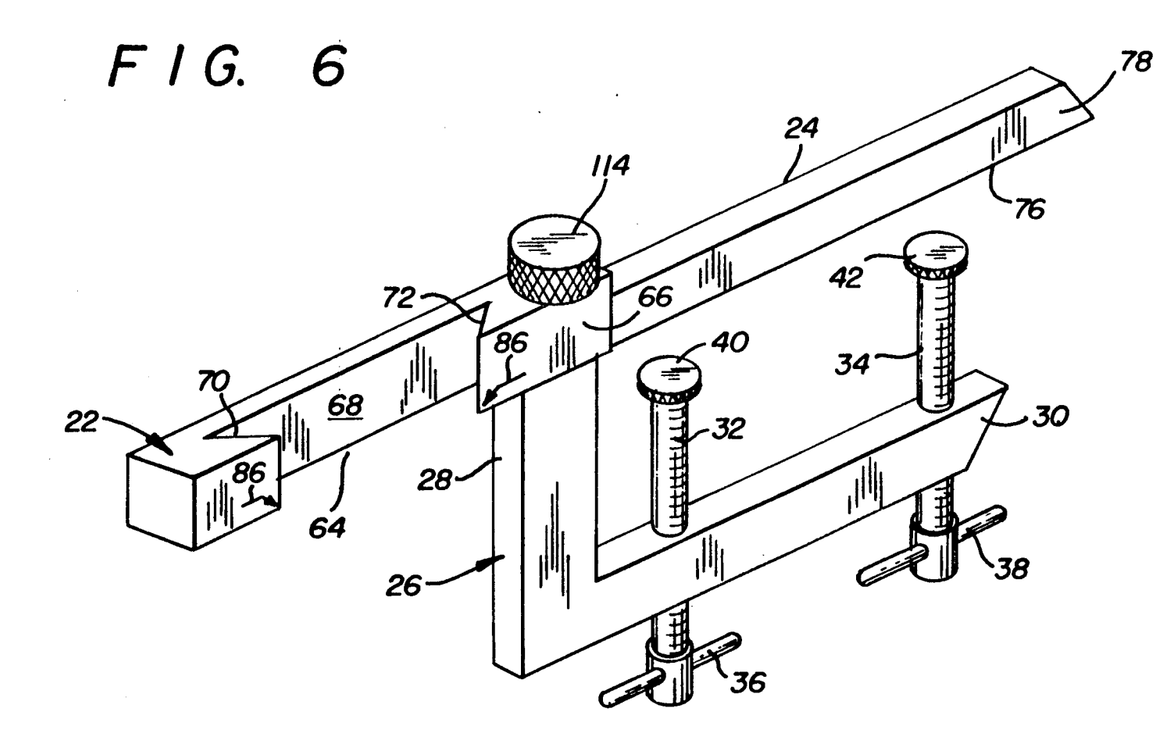
FIG. 6 is a view similar to FIG. 1 but showing the boring guide fixture with the guide block removed from the base member.

A clamping bracket, generally indicated at 26, is provide to secure the mounting and guide bar 24 to the top surface 14 of the plank 12. The clamping bracket 26 is L-shaped and includes a first leg 28 which is secured to the underneath side of the base member 22 in perpendicular relation thereto. The leg 28 is secured to the base member 22 at about the point where it extends beyond the side edge 16 of the plank. The bracket 26 also includes a second leg 30 which extends outwardly from the first leg 28 below the mounting and guide bar 24 in spaced apart, parallel relationship therewith. A pair of screw clamps 32, 34 having handles 36, 38, respectively, at one end, extend in spaced apart relation through the second leg 30. The clamps 32, 34 are provided with flat swivel disks 40, 42, respectively, at their opposite ends, as shown in FIGS. 2, 3 and 6, for making firm contact with the flat bottom surface of the plank 12.

A guide block 44 is provided for holding and accurately positioning an elongated boring bit shown at 46 in FIG. 1. In the embodiment of the boring guide fixture illustrated, the guide block 44 is a relatively thin, plate-like structure having rectangular front and rear faces 48, 50, respectively. The opposite side edges 52, 54 of the block include portions that are dovetailed as shown at 56 and 58, tapering outwardly from the front face 48 to the rear face 50, except at the lower end portion 60 of the block where both side edges are perpendicular to the front and rear faces 48, 50.

The boring bit 46 is inserted through an elongated boring guide hole 62 provided in the lower end portion 60 of the guide block 44. The boring guide hole 62 extends from one side edge 52 to the other side edge 54 of the block in parallel relation to both the front and rear faces 48, 50.

The guide block 44 is slidably mounted inside an open groove 64 provided in the front wall 66 of the base member 22. As best shown in FIG. 6, the groove 64 has a flat back wall 68 which lies in a plane that is perpendicular to the surface of the workpiece, i.e., the side edge 16 of the plank 12. The groove 64 also has opposite side edges which are dovetailed as shown at 70, 72, tapering inwardly from the back wall 68, and which guidingly receive the dovetailed edges 56, 58 of the guide block 44. The guide block 44 fits snugly inside the groove 64 with a minimum of clearance sufficient to allow movement of the block along a path extending across the side edge 16 of plank 12 in parallel relation thereto. The back wall 68 and dovetailed edges 70, 72 of groove 64 combine to keep the longitudinal axis 74 (FIG. 1) of the boring guide hole 62 in a plane perpendicular to the surface of the workpiece regardless of the position of the guide block 44 as it moves through the groove 64. Stability of the guide block 44 inside the groove 64 is increased by making the height of the base member 22 greater than that of the mounting and guard bar 24 as best shown in FIGS. 2 and 3. This effectively increases the length of the groove 64 and prevents against lateral movement of the block during use of the fixture.

The boring guide hole 62 should be of sufficient length to hold the boring bit 46 steady and to guide it accurately along a straight path as it passes through the workpiece. It has been found that for best results the length of the boring guide hole 62 and, consequently, the width of the lower end portion 60 of the guide block 44, should be at least one-quarter of the width of the plank 12. Of course, the diameter of the hole itself should be only slightly larger than that of the boring bit 46, i.e., just large enough to allow the bit to enter and pass through the hole, so as to prevent any lateral movement that may cause misalignment of the bit during its travel through the workpiece.

Figure 4:
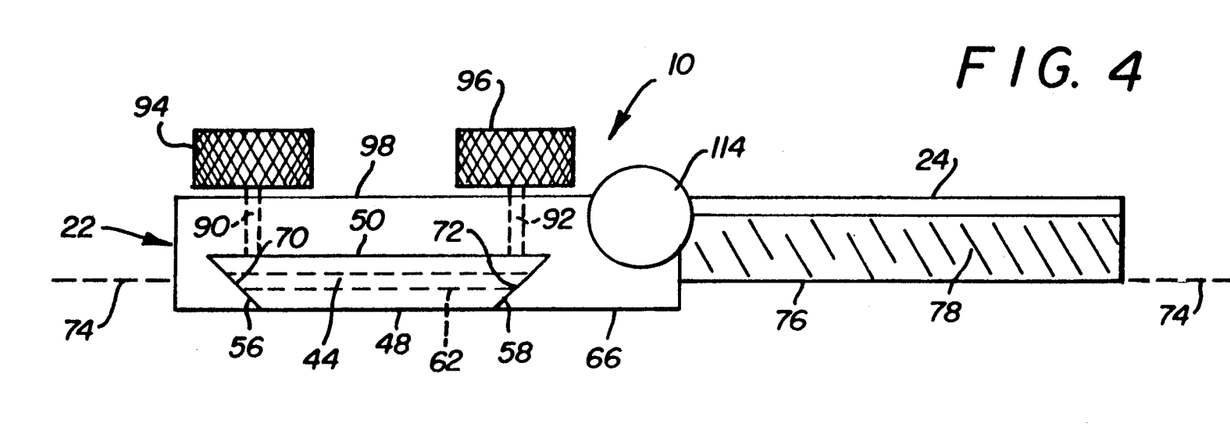
FIG. 4 is a top plan view of the fixture.
Figure 5:
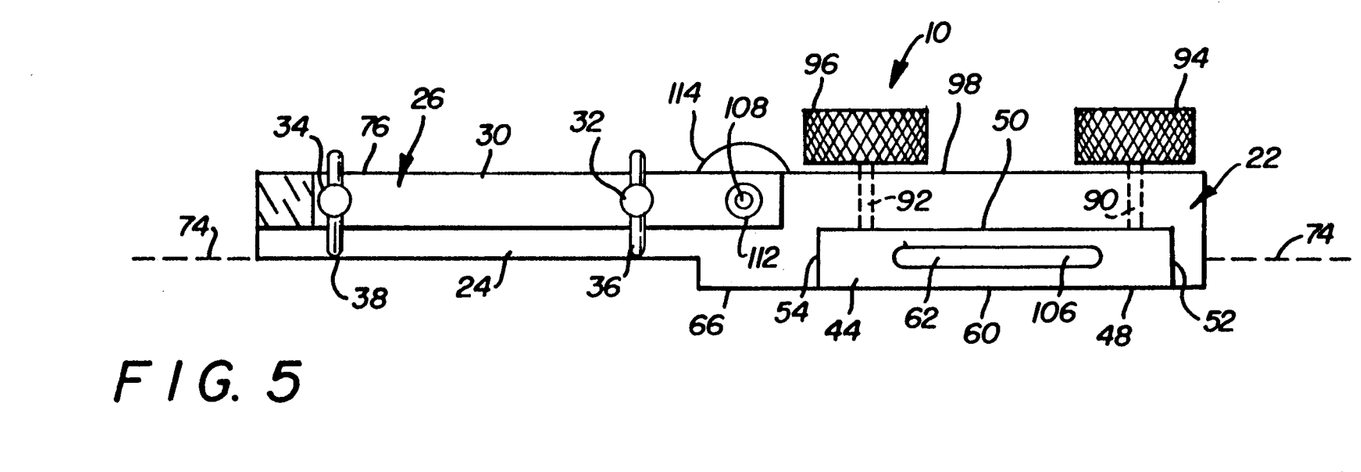
FIG. 5 is a bottom view of the fixture.

As best shown in FIGS. 4 an 5, the forward edge portion 76 of the mounting and guide bar 24 is preferably substantially parallel to the longitudinal axis 74 of the boring guide hole 62, both the forward edge 76 and the longitudinal axis 74 lying in a plane that is substantially normal to the top surface of the workplace. Thus, the boring bit 46 will always lie directly underneath the forward edge 76 as it passes through the workpiece, in this case, the plank 12. This is an important feature of the instant fixture since in those cases where the plank 12 may be wider than the guide bar 24 is long, the fixture may be place on one side of the plank to start the hole and then removed and placed on the opposite side of the plank to finish the hole, striking a line on the top surface 14 of the plank and then aligning the fixture along the same line using the guide bar 24 as an alignment tool. Preferably, the mounting and guide bar 24 is beveled along its forward edge 76 as shown at 78 in order to avoid casting a shadow on the workpiece which might otherwise obscure the line drawn on the top surface 14.

An elongated scale 80 is affixed to the front face 48 of the guide block 44 to aid in locating the boring guide hole 62 and, consequently, the bit 46, at a selectable, predetermined position relative to the surface of the workpiece. The scale 80 is marked off in individual units of measure such as fractions of an inch, for example, as shown at 82, similar to a measuring rule, which increase in magnitude starting with the first mark 84 at the bottom of the scale. A pointer 86 or other mark is affixed to the front wall 66 of the base member 22 to indicate the location of both the boring guide hole 62 and the boring bit 46.

In the embodiment of the fixture illustrated, there are two pointers 86, one located on each side of the guide block 44, which lie adjacent to the lower edge of the base member 22. The unit of measure indicated by the first mark 84 (e.g., ¼ inch on the scale shown in FIG. 1) represents the distance between that mark and the axis 74 of the boring guide hole 62 when the guide block 44 is fully elevated in the groove 64, that is, when the block is elevated to the point where its lower end 60 comes to rest against the underneath side of the base member 22. Since the top surface 14 of the plank 12 lies in the same plane as the underneath side of the base member 22, the unit of measure indicated by the mark appearing opposite the pointer 86 represents the location of the center of the hole, shown at 88, to be bored through the side edge 16 of the plank, measuring down from the top surface 14. It is relatively easy then by simply moving the guide block 44 through the groove 64 to position the boring guide hole 62 and, consequently, the boring bit 46, at any desired, selectable position on the side edge 16 of the plank for boring a hole therethrough.

A pair of screws 90, 92 having torque knobs 94, 96, respectively, at their outer ends, extend through the rear wall 98 of the base member 22 as best shown in FIGS. 4 and 5. The screws 90, 92 contact the block 44 at their opposite ends to secure the block in place once the boring guide hole 62 has been properly located for boring the hole in the workpiece. The torque knobs 94, 96 limit the amount of torque that can be applied to the screws 90, 92 and thus guard against damaging the screws or the block.

The screws 90, 92 are preferably used in conjunction with a series of notches 100, 102 provided on the rear face 50 of the guide block 44 as best shown in FIG. 3. The notches 100, 102 are adapted to receive the ends of the screws 90, 92 and assist in securing or locking the guide block 44 within the groove 64. Preferably, the notches are arranged to correspond to each unit of measure 82 on the scale 80. It will be seen by this arrangement that the guide block 44 can be easily indexed to locate the boring guide hole 62 at a given point on the side edge 16 of the plank 12 where the hole is to be drilled.

It will be seen particularly from FIG. 1 that the side edge 54 of the guide block 44, which includes the exit end of the boring guide hole 62, is separated from the workpiece by the width the first leg 28, providing a space 104 therebetween. The leg 28 acts as a stop upon which the side edge 16 of the plank 12 rests when the fixture is mounted on top of the plank. The space 104 allows room for dust and/or chips to accumulate on the bit 46 during the boring operation and a clearance for easy removal of the dust and/or chips without having to withdraw the bit 46 from the boring guide hole 62.

As best shown in FIG. 5, the guide block 44 is further provided at its lower end with an elongated slot 106 which communicates directly with the boring guide hole 62. This slot 106 allows dust and/or chips that collect around the boring bit 46 inside the boring guide hole 62 to fall freely from the hole during operation and cleaning of the fixture.

It may be desirable at times to position the clamping bracket 26 at an angle with respect to the mounting and guide bar 24, for example, in those cases where the area located just beneath the workpiece may be obstructed by an external object. With this in mind, the clamping bracket is advantageously affixed to the base member 22 using a pivot pin or a long screw 108, which extends completely through the first leg 28 in an elongated hole 110 and which has its lower end screwed into a taped hole 112 in the second leg 30 as best shown in FIGS. 3 and 5. A knob 114 is affixed to the upper end of the screw 108 on top of the base member 22. Thus, by simply turning the knob 114, the whole clamping bracket 26 can be loosened to position the bracket at any desired angle with respect to the mounting and guide bar 24 and then tightened again to secure the fixture on top of the workpiece.

The following description illustrates a typical boring operation using a boring guide fixture according to the invention to bore a hole accurately through the center of the width of a ¾ inch thick by 11½ inch wide wooden plank (trade size—1 by 12 inch). The plank is first secured to a work bench using a C-clamp or the like as shown in FIG. 1. The screws 90, 92 in the rear wall of base member 12 are loosened by turning knobs 94, 96 to allow the guide block 44 to move freely through the groove 64. Since the plank measures ¾ inch in thickness and the hole is to be drilled in the center of its side edge 16, the guide block 44 is moved up or down, as the case may be, to position the ⅜ inch mark on the scale 80 opposite the pointer 86 and the screws 90, 92 are tightened to lock the guide block 44 in place on the base member 22. A straight line is drawn across the top surface 14 of the plank in the direction of the hole to be bored. The pair of clamping screws 32, 34 are opened by turning them counterclockwise until the two disks 40, 42 are positioned approximately ¼ inch or more than the thickness of the plank. The boring guide fixture is then slipped over the plank until the side edge 16 contacts the leg 28 which act as a stop. The mounting and guide bar 24 is then aligned with the drawn line on the top surface 14 of the plank and the pair of clamping screws 32, 34 are tightened by turning them clockwise, securing the boring guide fixture to the workpiece. A boring bit 46, say ¼ inch in diameter by 12 to 18 inches in length, for example, is secured into a drill motor chuck for boring the desired hole. The bit is then inserted into the boring guide hole 62 in the guide block 44 until the bit makes contact with the side edge 16 of the plank. With the drill motor and boring bit turning clockwise at a slow to medium rate, a liberal amount of pressure is applied to the drill motor and bit, boring only approximately ½ inch in depth into the plank at a time, while retracting the boring bit frequently from the plank (but not from the boring guide hole) to remove dust and/or chips from the cleaning area 104. As soon as the required depth and/or length of hole has been reached, the boring bit 46 can be completely withdraw from the boring guide hole 62 and the fixture removed by loosening the clamps 32, 34 and sliding the base member off the plank.

What is claimed is:

1. A fixture for accurately boring a hole in a workpiece comprising, in combination:

a base member, said base member having an elongated mounting and guide bar extending from one side thereof, said mounting and guide bar having a substantially flat surface adapted to make contact with the top of said workpiece and having an elongated straight lateral edge over at least a portion thereof;

clamping means for securing said base member to said workpiece;

a guide block mounted in said base member for a movement confined sliding to and fro along a path extending across a surface of said workpiece, said guide block having an elongated boring guide hole for guidingly receiving a boring bit therein, said boring guide hole extending through said guide block in a direction toward said surface of said workpiece; and means for securing said guide block in place once said boring guide hole has been located at a selectable, predetermined position relative to said workpiece surface;

the arrangement of said mounting and guide bar on said base member being such that said straight lateral edge is substantially parallel to the longitudinal axis of said boring guide hole in said guide block, said straight lateral edge and said longitudinal axis of said boring guide hole lying in a plane that is substantially normal to the top surface of said workpiece.

2. A fixture according to claim 1 wherein said mounting and guide bar is beveled in a direction away from said straight lateral edge along at least a portion thereof.

3. A fixture according to claim 1 wherein said clamping means comprises a bracket affixed to said base member and having an elongated leg spaced apart from said mounting and guide bar and at least one clamping screw extending through said elongated leg for holding said workpiece against said flat surface.

4. A fixture according to claim 1 wherein said guide block is slidably mounted within said base member for movement along said path and wherein said elongated boring guide hole is located at one end of said guide block.

5. A fixture according to claim 4 wherein said guide block is slidably mounted in a groove formed within a side wall of said base member.

6. A fixture according to claim 5 wherein said groove is dovetailed and wherein said guide block has dovetailed lateral edges tapered outwardly from one side thereof.

7. A fixture according to claim 1 wherein said means for securing said guide block in place comprises at least one screw extending through said base member and adapted to make contact with said guide block.

8. A fixture according to claim 7 wherein a torque knob is affixed to the end of said screw.

9. A fixture according to claim 3 wherein said bracket is adjustably affixed to said base member so that said bracket can be positioned at any desired angle with respect to said mounting and guide bar.

10. A fixture according to claim 9 wherein said bracket comprises a first leg disposed perpendicular to said base member and a second leg disposed in spaced apart relation with said mounting and guide bar, and wherein said first and second legs are secured together by a pivot pin member passing through both said base member and said first leg and having an end secured to said second leg.

11. A fixture according to claim 10 wherein said pivot pin member is a long screw having a knob at one end for turning said screw and having its opposite end secured in a taped hole in said second leg.

12. A fixture according to claim 1 wherein said elongated boring guide hole is at least one-quarter of the length of hole to be bored in the workpiece.

13. A fixture according to claim 1 further including indicia means for locating said boring guide hole at said selectable, predetermined position relative to said workpiece surface.

14. A fixture according to claim 13 wherein said indicia means comprises an elongated scale which is affixed to one side of said guide block.

15. A fixture according to claim 14 wherein said scale contains individual marks representing units of measure for indicating the distance between the longitudinal axis of said boring guide hole and a fixed point on said base member.

16. A fixture according to claim 14 further including means for indexing said guide block at varying points along its length to aid in locating said boring guide hole at said selectable, predetermined position relative to said workpiece surface.

17. A fixture according to claim 16 wherein said means for securing said guide block in place comprises at least one screw extending through said base member and wherein said indexing means comprises at least one group of spaced apart notches arranged in a straight line on one side of said guide block, each of said notches being adapted to receive said screw and being arranged to correspond to an individual mark on said scale.

18. A fixture for accurately boring a hole in a workpiece comprising, in combination:

a base member, said base member having an elongated mounting and guide bar extending from one side thereof;

clamping means affixed to said base member for securing said mounting and guide bar to the top of said workpiece;

a guide block having a dovetailed lateral edges slidably mounted within a dovetailed opening in said base member and adapted for movement along a path extending across a surface of said workpiece, said guide block having an elongated boring guide hole for guidingly receiving a boring bit therein, said boring guide hole extending through said guide block in a direction toward said workpiece surface;

an elongated scale affixed to one side of said guide block for locating said boring guide hole at a selectable, predetermined position relative to said workpiece surface; and means for securing said guide block in place one said boring guide hole has been located at said selectable, predetermined position.

19. A fixture for accurately boring a hole in a workpiece comprising, in combination:

a base member, said base member having an elongated mounting and guide bar extending from one side thereof, said mounting and guide bar having a substantially flat surface adapted to make contact with the top of said workpiece and having an elongated straight lateral edge over at least a portion thereof;

a clamping bracket having a first leg affixed to said base member and a second leg extending in spaced apart relation from said mounting and guide bar and having clamping screw means extending through said second leg for securing said workpiece against said flat surface of said mounting and guide bar;

a guide block having dovetailed lateral edges slidably mounted in a dovetailed groove provided on one side of said base member and adapted for movement along a path extending across a surface of said workpiece, said guide block having an elongated boring guide hole for guidingly receiving a boring bit therein, said boring guide hole extending through said guide block in a direction toward said workpiece surface, the arrangement of said mounting and guide bar on said base member being such that said straight lateral edge is substantially parallel to the longitudinal axis of said boring guide hole;

an elongated scale affixed to one side of said guide block for locating said boring guide hole at a selectable, predetermined position relative to said workpiece surface;

means for indexing said guide block at varying points along its length to aid in locating said boring guide hole at said selectable, predetermined position; and means for securing said guide block in place once said boring guide hole has been located at said selectable, predetermined position.

20. A fixture for accurately boring a hole in a workpiece comprising, in combination:

a base member, said base member having a dovetailed groove on one side thereof and including an elongated extension adapted to fit over the top of said workpiece;

clamping means for securing said base member to said workpiece;

a guide block having dovetailed lateral edges tapered outwardly from one side thereof, said guide block being slidably mounted in said dovetailed groove on said base member for movement along a path extending across a surface of said workpiece, said guide block having an elongated boring guide hole for guidingly receiving a boring bit therein, said boring guide hole extending through said guide block in a direction toward said workpiece surface;

indicia means for locating said boring guide hole at a selectable, predetermined position relative to said workpiece surface; and means for securing said guide block in place once said boring guide hole has been located at said selectable, predetermined position.

21. A fixture for accurately boring a hole in a workpiece comprising, in combination:

a base member, said base member including an elongated extension adapted to fit over the top of said workpiece;

clamping means for securing said base member to said workpiece;

a guide block mounted in said base member for movement along a path extending across a surface of said workpiece, said guide block having an elongated boring guide hole for guidingly receiving a boring bit therein, said boring guide hole extending through said guide block in a direction toward said workpiece surface;

scale means including individual marks for locating said boring guide hole at a selectable, predetermined position relative to said workpiece surface;

means for indexing said guide block at said selectable, predetermined position relative to said workpiece surface comprising two groups of spaced apart notches arranged in a straight line on one side of said guide block, each of said notches corresponding to an individual mark on said scale; and means for securing said guide block in place once said boring guide hole has been located comprising a pair of spaced apart screws extending through said base member and adapted to engage said notches.

* * * * *